United States Patent [19]

Laflamme

[11] 4,257,306
[45] Mar. 24, 1981

[54] ELECTRONIC DISPLAY DEVICE FOR FRETTED STRINGED INSTRUMENTS

[76] Inventor: Daniel Laflamme, 2748 Ohara La., Cresent Beach, British Columbia, Canada

[21] Appl. No.: 871,173

[22] Filed: Jan. 23, 1978

[51] Int. Cl.³ .................. G10G 1/02; G09B 15/02
[52] U.S. Cl. .................. 84/485 R; 340/711; 340/365 S; 434/322; 434/428
[58] Field of Search .................. 84/485R, 478, 477 R, 84/DIG. 30; 340/337, 365 R, 365 S, 711; 35/6

[56] References Cited
U.S. PATENT DOCUMENTS

| | | | |
|---|---|---|---|
| 3,379,087 | 4/1968 | Weitzner | 84/478 |
| 3,403,591 | 10/1968 | Weitzner | 84/485 |
| 3,978,757 | 9/1976 | Johnson | 84/485 R |
| 4,048,634 | 9/1977 | Laflamme | 84/478 |

Primary Examiner—George H. Miller, Jr.
Assistant Examiner—S. D. Schreyer
Attorney, Agent, or Firm—Sixbey, Friedman & Leedom

[57] ABSTRACT

A small lightweight electronic device to indicate the finger positions of a fretted stringed instrument represented by the musical intervals or chords in any key. The device has a series of on-off switches representing each of the desired musical keys and a series of switches representing the individual musical intervals over a desired range. The necessary circuitry is provided between these switches and a display of the frets and strings of the instrument such that the finger positions represented by a chord or series of musical intervals in a selected key are visually indicated on the display. Professional musicians and students or teachers of music for fretted stringed instruments can, using this device, visualize the location of intervals or chords of any key.

13 Claims, 2 Drawing Figures

ELECTRONIC DISPLAY DEVICE FOR FRETTED STRINGED INSTRUMENTS

BACKGROUND OF THE INVENTION

This invention relates to an electronic device for identifying intervals or chords in a particular key for a fretted stringed instrument. More particularly, the invention relates to an electronic device which will indicate the finger positions on the strings of a fretted, stringed instrument represented by a particular series of musical intervals or a particular chord in a particular key. The device will further permit easy transposition or identification of such musical intervals or chords from one key to another.

This invention is related, although by no means identical, to the keyboard display device described and illustrated in my U.S. Pat. No. 4,048,634, issued Sept. 13, 1977.

It is understood, from musical theory, that in a given key of the chromatic musical series, each note has a "value" or "musical interval". For example, in the key of C, the note E has value or musical interval which is a "major third", while the note G is a "fifth" and the note B is a "major seventh". The note D sharp appearing in the octave above that of the root position of C, in the key of C, is an "augmented ninth", and so forth. For a guitar or other fretted, stringed instruments, the playing of a particular chord is accomplished by pressing and securing individual strings of the instrument at various, predetermined fret positions so that when all or a group of the strings of the instrument are struck simultaneously or in sequence, that chord or the notes of that chord are sounded. As will be understood by anyone who has studied guitar or other fretted instruments, the spread of the fingers of the player in depressing the strings to play a chord is usually no more than four frets. As well, by moving the finger positions for a particular chord up or down one or more frets while maintaining the same relative finger positions across the strings of the instrument, equivalent chords, but in a different key, are sounded when the strings are played. Thus, for example, in a guitar, the C major chord is sounded when the first, second and sixth strings are depressed in the eighth fret, the third string is depressed in the ninth fret and the fourth and fifth strings are depressed in the tenth fret. In actually depressing the strings as indicated to enable the playing of such a chord on a guitar, the index finger of the playing hand would lie across all of the strings on the eighth fret, this being called the "bar position" or these strings being "barred" on the eighth fret. The second finger would then press the third string on the ninth fret and the remaining fourth and fifth fingers would depress the fourth and fifth strings respectively at the tenth fret. Having located one fingering position for the C major chord, at the eighth fret, by moving the fingering "up" one fret so that the index finger bars the six strings at the seventh fret, a B major chord may be played. By moving the fingering up yet another position, a B flat major chord or an A sharp major chord is played, and so on.

It is significant, when understanding the theory behind chording on a guitar or other fretted stringed instrument, and as well in understanding the theory behind the present invention, to realize that each string is tuned for a particular "note" and that by depressing the strings of the instrument at various positions, various alternative notes are then played on that string. These notes have particular values or musical intervals depending on the key which is intended to be played. For example, returning to our example of the C major chord as played on a six stringed guitar, a guitar which is tuned as follows:

first string—E
second string—B
third string—G
fourth string—D
fifth string—A
sixth string—E, this chord requires, if the bar position is on the eighth fret, pressing the third string on the ninth fret, fourth and fifth strings, on the tenth fret with the rest of the strings barred on the eighth fret. The first string, when depressed on the eighth fret, results in a note eight semitones higher, namely a C, this being a root position of the C major chord. The second or B string when depressed on the eighth fret, produces a G note which is a fifth position in the key of C; the third string, being depressed on the ninth fret for the C major chord, gives an E note (i.e. nine semi-tones higher than G), this being a third in the key of C. The fourth or D string, depressed on the tenth fret, results in a C or root position note; the A string depressed in the tenth position results in a G or fifth; the last or E string, depressed in the eighth position, results in a C note, again being the root position of the C major chord. It will be seen that only the root, third and fifth "intervals" are thus played on the guitar, these being, as we would expect, proper musical intervals to be played for a major chord in that particular key. By moving this same fingerng up or down the frets of the instrument, the root, third and fifth positions are still maintained, albeit for a different key depending upon the fret positions of this fingering. In a similar manner, any of the other chords for the key of C may be worked out, for example using the eighth fret as the bar position. For instance the C major seventh chord having the same fingering as the C major chord, with the exception that the fourth string is depressed on the ninth fret instead of the tenth fret (this results in a note of a seventh interval, instead of a note of the root position for this key, being played). Thus the C major seventh chord has notes representing root, third, fifth and seventh positions being played. The fingering of C suspended fourth, C ninth, C minor, C minor seventh, C minor eleventh, C minor thirteenth, and any other words chords which a musician might wish to play in the key of C can be similarly studied and learned for example using the eighth fret as the bar position, the fingering and musical intervals of the particular notes of the strings played, being derivable in a similar manner to that described above. Equivalent chords for any other key, such as F, with appropriate fingering positions and the equivalent musical intervals of the respective notes played by the strings having that fingering, may be derived either by using equivalent relative fingering positions from another key such as C and moving the fingering up or down an appropriate number of frets. Alternatively, different relative fingering for a particular bar position, to give the F chords for that particular position, may be worked out, as illustrated above for the key of C.

Chording in a particular key, accomplished by depressing the strings on the particular frets to give notes having appropriate musical interval values for that key, is an essential element in the playing, teaching or studying of music on such a fretted, stringed instrument.

Heretofore, aids for the teaching or study of music for stringed, fretted instruments has been mainly restricted to charts in books, such charts setting out illustrations of the strings and frets of that particular instrument, together with some indication of the fret positions for each of the strings to be played to achieve a particular chord in a given key. A single, written diagram for a single chord in a particular key is shown in such charts.

There has been little or nothing in the way of mechanical or visual keyboard teaching devices for guitars, in the nature of the mechanical or chart devices as described for keyboard instruments in Canadian Pat. No. 910,991 of A. J. Weis, issued June 8, 1965 or Gaillard, Canadian Pat. No. 773,425, issued Dec. 12, 1967, or Smoyer, et. al., Canadian Pat. No. 831,713, issued Jan. 13, 1970. This latter patent describes and illustrated a visual keyboard teaching device providing a visual indication, directly on a keyboard instrument, of the companion manual and clavial keys to be associated to a sound chord triad, with the accompanying bass note. My previously indicated U.S. Pat. No. 4,048,634, issued Sept. 13, 1977 describes a small lightweight electronic instrument which indicates the note of a keyboard instrument represented by any musical interval in any key so that a musician can, using the device, produce a visual indication of the location of notes or chords of that keyboard instrument on the display area of the device.

It is an object of the present invention to provide a small lightweight electronic device, to be used in the study or teaching of music for fretted, stringed instruments, which will identify the finger positions required to achieve a particular chord in a particular key. It is a further object of the present invention to provide such a device which will enable easy transposition of and location of string and fret finger positions of corresponding chords in different keys.

SUMMARY OF THE INVENTION

In accordance with the present invention an electronic device is provided for visually illustrating the string and fret finger positions of a given chord in a particular key for a fretted stringed instrument. The device comprises a series of manually operable on-off key selector switches, one key selector switch associated with each desired key and each switch being independently and not simultaneously actuable with respect to the other key selector switches. A series of manually operable on-off musical interval selector switches is provided, one interval selector switch being associated with the value of each desired musical interval, and each musical interval selector switch being simultaneously operable with one or more other musical interval selector switches in the "on" position. The device has a visible representation of the frets over a particular range and of the strings of the fretted instrument. An electronicly actuated string and fret finger position indicator means is associated with the fret and string representation, each of the string finger positions for each of the frets having independently electronically actuated indicator means associated with it. Circuitry associated with the key selector switches, interval selector switches and string and fret finger position indicator means permits actuation of those finger position indicator means associated with the particular finger positions on the fret and string display corresponding to the chord represented by a selected key and series of selected musical intervals. The device is preferably provided with a fret indicator means visually associated with the finger position indicator means and having appropriate circuitry associated therewith so that the number of the bar position fret for a selected, indicated chord is displayed.

It is preferred that the fourteen keys of the chromatic musical series be represented by key selector switches, one switch for each key. The device may be designed to illustrate any desired range of frets and may be set up to show chords of any degree of complexity. Thus a "learner's device" may be designed to show simple chords which would normally be used by a person learning how to play a guitar or a device may be designed to show alternatively or additionally the more complicated chords which would be used by a professional musician.

The device is of course primarily designed for a six-string guitar or other similar six string fretted instrument. However, similar devices may be designed, using the same principles and theory of the present invention, for other stringed, fretted instruments such as a banjo.

The device according to the present invention provides an inexpensive, simple and effective tool for teaching or learning music on a stringed, fretted instrument. For example, it enables a guitarist to identify immediately on the visible fret and string representation of the device a particular chord in a particular key. Moreover, by merely operating the relevant key selector switch on the device, the precise fingering positions for this chord in any other key may be immediately indicated. Professional musicians, music arrangers, composers and the like, who are working with guitars and guitar music, will also benefit greately from this device.

BRIEF DESCRIPTION OF THE DRAWINGS

Other objects and advantages of the present invention will become apparent upon reading the following detailed description and upon referring to the drawings in which.

Similar features have been given similar reference numerals in the drawings.

While the invention will be described in connection with example embodiments, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
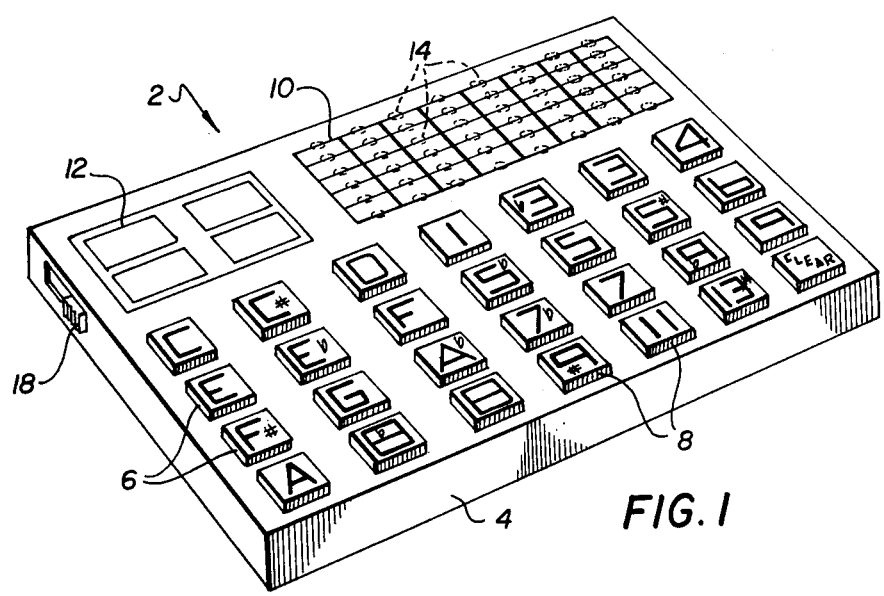
FIG. 1 is a perspective view of an example embodiment of an electronic keyboard display device according to the present invention.

Turning first to FIG. 1 there is shown an electronic display device 2 having frame 4, key selector switches 6, musical interval selector switches 8, fret and string representation 10 and fret indicator 12. Appropriate key and musical interval notations appear respectively on the key selector switches 6 and musical interval selector switches 8. Of the twelve key selector switches of the illustrated embodiment, one switch is provided for each of the twelve keys (or enharmonic values thereof) of the chromatic series. The musical interval and key selector switches are push-in-push-out switches with means to identify these switches after being actuated. Such means may be a light associated with the switch to be actuated while the switch itself is in the actuated state, or alternatively it may be a push-in-push-out switch which remains in pushed in or depressed position after being actuated.

It should be understood that the key selector switches are independently and not simultaneously actuable with respect to the other such key selector switches. On the other hand, the musicial interval selector switches are simultaneously operable with one or more other of the musical interval selector switches in the "on" position.

String and fret representation 10 consists of a representation of the strings and frets of a particular stringed fretted instrument, such as a guitar, over a desired range. In the illustration a range is shown as being twelve frets although any other appropriate fret range with corresponding, appropriate circuitry, may be used. In string and fret representation 10, each of the strings on each of the frets where the string might be depressed by a finger for a particular chord in a given key has associated with it illuminating means 14 (e.g. a light bulb), which, when on, illuminates that particular string finger position. The device may have as its power source any appropriate battery 16 actuated by a main on-off switch 18.

Figure 2:
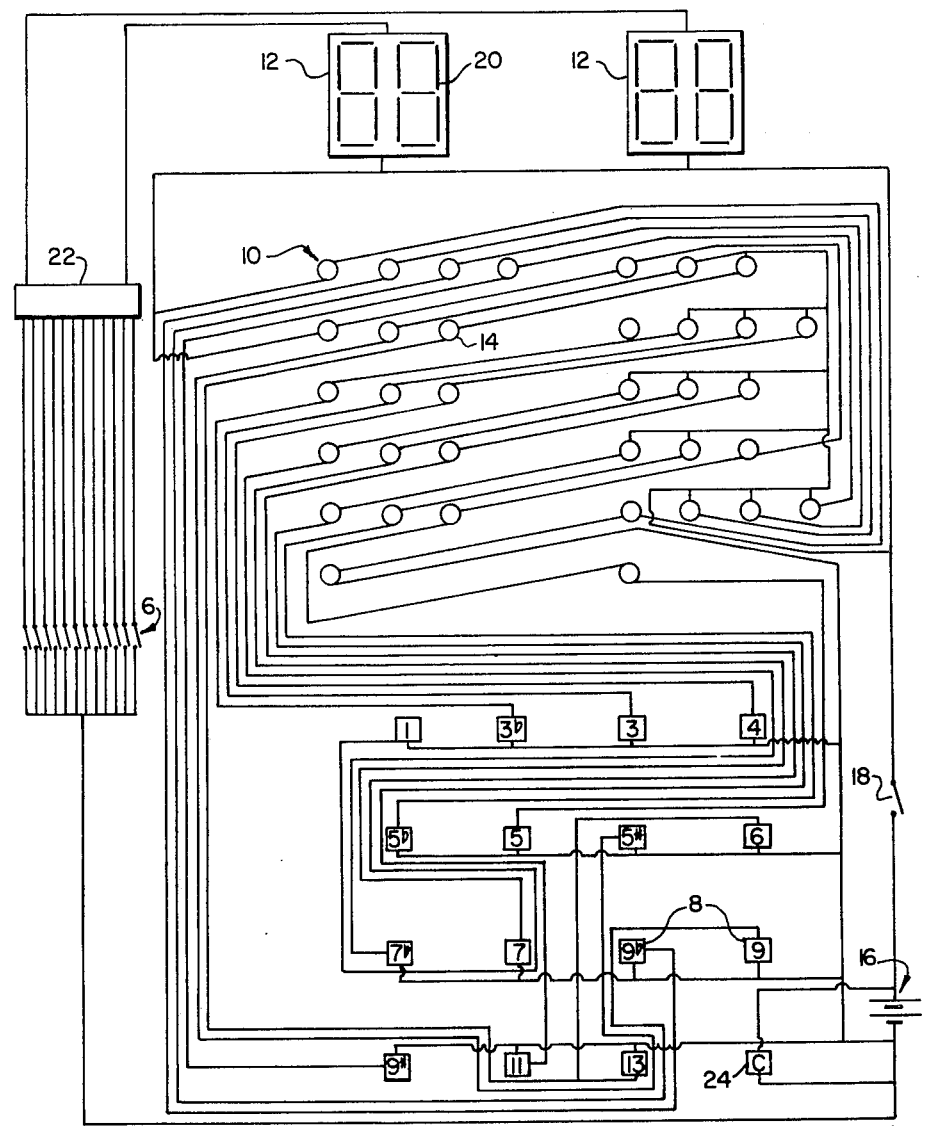
FIG. 2 is an example of a circuit diagram of a circuit network which may be used in the device according to FIG. 1.

Circuitry, a preferred but by no means exclusive example of which is illustrated in FIG. 2, is associated with main switch 18, battery 16, illuminating means 14, key selector switches 6 and musical interval selector switches 8 so that when a particular key is selected by pushing the corresponding key selector switch, and a particular musical interval or number of musical intervals constituting a desired chord are selected by pushing appropriate musical interval selector switches 8, the appropriate illuminating means 14 are actuated to indicate on the string and fret representation 10 the fret locations to be depressed for the strings of the instrument to produce the chord represented by those musical intervals in that particular key. Selection of another key selector switch while maintaining actuation of the same musical interval selector switches will immediately illustrate the new fret location to be depressed for the strings to produce that chord in the newly selected key.

The particular circuitry illustrated in FIG. 2 has been derived from working out the fingering positions for various chords at the third and eighth fret of a guitar for the key of C to enable illustration of the basic fingering positions for a selected note or chord in that key, the note or chord being made up of any one or more root positions, of thirds, diminished thirds, suspended thirds, diminished fifths, fifths, augmented fifths, sixths, major sevenths, sevenths, dimished ninths, ninths, augmented ninths, elevenths, augmented elevenths, and thirteenths when barred at the third fret (shown in the first four frets of representation 10) and, simultaneously when barred at the eighth fret (shown in the last four frets of representation 10).

It will be understood, according to the preceding theorical discussion, that once the fingering positions for notes and chords in a key such as C, when barring a particular fret, have been determined and appropriate circuitry has been worked out for such fingering positions, this circuitry may be used to represent fingering for similar chords in other keys so long as there is an appropriate display representation of the bar positions to be used for those chords, since the relative fingering for equivalent chords in different keys remains identical but is shifted either up or down the frets of the instrument according to the desired key.

Again, given the circuitry and concept of the present invention as disclosed, it is within the scope of the present invention, using chording for other keys, e.g. the key of G, etc., to derive corresponding circuitry and provide a similar device which will provide a display of the fingering for that or any other desired chord. Alternatively, while the invention as illustrated is described for use in association with a guitar, appropriate circuitry may be worked out for instruments having differing numbers of strings (e.g. a banjo) or chord fingering positions which differ from those of a guitar. Again it is intended that such modification be included within the broad scope of the present invention.

The circuitry will of course depend, to some extent, upon the range of frets illustrated on the string and fret representation 10. As most chords on a guitar require fingering over a maximum of four adjacent frets, the string and fret representation might require only four adjacent frets. In such a case, or where more than four frets are illustrated (but short of the complete fret range of the instrument in question), to give the user of the device an accurate idea of the frets on which his selected chord for a particular key is to be played, it is preferred that an appropriate fret indicator means 12, or series thereof, be provided. As previously indicated, in the present case, two four fret ranges are represented, adjacent each other, at string and fret representation 10, with two corresponding fret indicator means 12 being provided. These two fret indicator means are useful because a given chord in a given key may be playable, with the identical or different fingering, at more than one location along the neck of the instrument. As illustrated, the device according to the present invention may have a series of LED devices 20 constituting these fret indicator means, and appropriate converter 22 associated with the branches of circuitry associated with the key selector switches 6 so that those fingering positions in that key for a particular selected chord or series of musical intervals selected, in a selected key, the two different fingering positions for which chord are shown in the two adjacent four fret and string representations 10, the two alternative bar positions are simultaneously illustrated at LED devices 20. Converter 22, associated with key selector switch circuitry, is any suitable electronic component which will take the particular electronic signal from the circuit branch corresponding to the key selector switch 6 which is actuated and convert this signal to give the appropriate form display at LED devices 20. Thus, if the key selector switch for the key of C is actuated in the illustrated embodiment, the LED devices 20 of fret indicators 12 will illuminate as "3" and "8" respectively, showing that the chlords or notes selected at switches 8, are to be played as shown in the first four frets at representation 10 with the third fret of the guitar barred, and as shown in the last four frets at representation 10 with the eighth fret barred. If instead of the key selector switch for C, that for C♯ is actuated, fret indicators 12 will illuminate as "4" and "9" respectively, and it will be apparent that notes or chords in the key of C♯ can be played on the guitar using identical fingering to that for corresponding notes or chords in the key of C barring the third and eighth frets, only barring instead the fourth and ninth frets respectively. In the same way, and following similar reasoning, the fret indicators 12 will show "5" and "10" for D, and so forth. Converter 22 may be made from for example, a programmable read-only-on-memory CMOS chip available today on the market. While not illustrated, fret indicator means 12 alternatively might take the form of a multiple position switch associated with an LED device. If a particular fingering position for a particular chord in a given key as illustrated on the LED device was not suitable, then use of the selector switch to provide, in sequence, alternative fingering positions for that chord in that key would be possible. Such an alternative type of fret selector switch would of course require corresponding modification to the circuitry to enable the desired results to be achieved.

It may also be noted that an appropriate "clear" switch 24 may be provided to deactuate the activated interval selector switches 8.

In operation, at any one particular time the device will given information about the location of a particular musical interval or a chord constituting a series of such intervals in any one particular key at the string and fret representation 10. In other words, for such a musical chord in a given musical key, as selected by the appropriate switches, the fret and string finger positioning represented thereby on the neck of the instrument will be illustrated at the string and fret representation. Moreover, by actuation of another key selector switch, the finger positioning for that chord in that other key can be immediately shown on the string and fret representation. Thus rapid identification of fingering for musical intervals or chords in one key and the transposition of the fingering for those musical intervals or chords from one key to another, for a stringed, fretted instrument can be achieved. In this way, the device permits a musician or a student of a guitar or other similar stringed and fretted instrument to identify the location of particular chords made up by particular musical intervals in a given key and, as well, to identify immediately the location of such a chord transposed into another key.

Using technology already available in miniature pocket-size calculators, such as printed circuitry, the device according to the present invention may be economically and readily constructed and marketed at a cost which would be reasonable even for a individual studying music.

Thus it is apparent that there has been provided in accordance with the present invention an electronic display device that fully satisfies the objects, aims and advantages set forth above. While the invention has been described in conjunction with a specific embodiment thereof, it is evident that many modifications and variations will be apparent to those skilled in the art in light of the foregoing description. Accordingly, it is intended to embrace all alternatives, modifications and variations as fall within the spirit and broad of the appdned claims.

I claim as my invention:

1. An electronic device for visually illustrating the finger positions necessary to produce a selected cord in a selected key on a stringed, fretted musical instrument, said device comprising:

(a) a frame structure including a display means for visually representing the strings and frets of a stringed, fretted musical instrument, said display means having at least two display ranges respectively corresponding to different fret ranges on the instrument;

(b) indicator means for identifying the instrument frets visually represented in each said display range;

(c) illuminating means for illuminating areas of each said display range in accordance with the various finger positions on the instrument strings relative to the instrument frets;

(d) a plurality of key selector switches connected to said indicator means and respectively representing various musical keys such that the actuation of said key selector switches causes said indicator means to indicate for each said display range the particular instrument frets used in conjunction with selected musical keys; and (e) a plurality of musical interval selector switches connected to said illuminating means and respectively representing various musical intervals such that the actuation of said musical interval selector switches causes said illuminating means to simultaneously illuminate predetermined areas in each said display range in order to provide visual representations of the particular instrument finger positions corresponding to selected musical intervals.

2. An electronic device for visually illustrating the bar and finger positions on a stringed, fretted musical instrument, and changes which occur when musical intervals corresponding to the illustrated finger positions are transposed from one key to another, said device comprising:

(a) a frame structure including a display means for visually representing the strings and frets of a stringed, fretted musical instrument;

(b) illuminating means for illuminating areas of said display means in accordance with the various finger positions on the instrument strings relative to the instrument frets;

(c) a plurality of musical interval selector switches connected to said illuminating means and respectively associated with various musical intervals such that the actuation of said musical interval selector switches causes said illuminating means to illuminate predetermined areas on said display means in order to provide visual representations of the particular instrument finger positions corresponding to selected musical intervals;

(d) indicator means for identifying the location of a mechanical bar device relative to the instrument frets represented on said display means; and (e) a plurality of key selector switches connected to said indicator means and respectively representing various musical keys such that the actuation of said key selector switches causes said indicator means to visually indicate the changes in mechanical bar position necessary to produce changes in the musical key of the instrument.

3. An electronic device as set forth in claim 2, wherein said display means includes at least two display ranges respectively corresponding to different fret ranges of the instrument and said illuminating means is connected to said plurality of musical interval selector switches such that the actuation of said musical interval selector switches causes said illuminating means to illuminate predetermined areas in each display range in order to provide visual representations of the particular instrument finger positions corresponding to selected musical intervals.

4. An electronic device as set forth in claims 1 or 3, including circuitry means having first and second circuit networks, said first circuit network comprising a plurality of first circuit branches respectively connected between said musical interval selector switches and said illuminating means and said second circuit network comprising a plurality of second circuit branches respectively connected between said key selector switches and said indicator means.

5. An electronic device as set forth in claim 4, wherein said indicator means includes a plurality of read-out means respectively associated with said display ranges.

6. An electronic device as set forth in claim 5, wherein said indicator means also includes a converter means connected in series between said second circuit branches and said read-out means.

7. An electronic device as set forth in claim 6, wherein said converter means is a programmable-read-only-memory chip.

8. An electronic device as set forth in claim 6, wherein said read-out means include a plurality of LED elements.

9. An electronic device as set forth in claim or 2, wherein said key selector switches respectively represent a chromatic progression of musical keys over an octave range.

10. An electronic device as set forth in claims 1 or 2, including a power source.

11. An electronic device as set forth in claim 10, wherein said indicator means, said illumination means, said plurality of key selector switches, said plurality of musical interval selector switches and said power source are mounted on said frame structure.

12. An electronic device as set forth in claim 11, wherein the dimensions of said frame structure are arranged such that said electronic device may be hand held.

13. An electronic device as set forth in claims 1 or 2, wherein only one of said key selector switches may be actuated at a time while each said musical interval selector may be actuated simultaneously with one or more of the remaining musical interval selector switches.

* * * * *